(12) United States Patent
Melloni et al.

(10) Patent No.: US 11,095,386 B2
(45) Date of Patent: Aug. 17, 2021

(54) ADD/DROP FILTER AND OPTICAL ADD/DROP MULTIPLEXER

(71) Applicant: HUAWEI TECHNOLOGIES CO., LTD., Shenzhen (CN)

(72) Inventors: Andrea Melloni, Milan (IT); Francesco Morichetti, Milan (IT); Ruiqiang Ji, Dongguan (CN); Douglas Aguiar, Milan (IT); Maziyar Milanizadeh, Milan (IT); Sujie Zhou, Chengdu (CN); Yanbo Li, Dongguan (CN); Long Luo, Dongguan (CN); Li Zeng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/931,714

(22) Filed: May 14, 2020

(65) Prior Publication Data
US 2020/0274631 A1 Aug. 27, 2020

Related U.S. Application Data

(63) Continuation of application No. PCT/CN2018/083036, filed on Apr. 13, 2018.

(30) Foreign Application Priority Data

Nov. 17, 2017 (CN) .......................... 201711148120.6

(51) Int. Cl.
*H04J 14/02* (2006.01)
*H04B 10/25* (2013.01)
*H04B 10/50* (2013.01)

(52) U.S. Cl.
CPC .......... *H04J 14/0201* (2013.01); *H04B 10/25* (2013.01); *H04B 10/50* (2013.01)

(58) Field of Classification Search
CPC ...... H04J 14/0201; H04J 14/02; H04B 10/25; H04B 10/50; H04B 10/27
(Continued)

(56) References Cited

U.S. PATENT DOCUMENTS 6,108,113 A * 8/2000 Fee .................. H04B 10/03
398/1
6,600,581 B1 * 7/2003 Fatehi ................ H04Q 11/0005
398/9
(Continued)

FOREIGN PATENT DOCUMENTS

CN 1336741 A 2/2002
CN 1467945 A 1/2004
(Continued)

OTHER PUBLICATIONS

Yunhong Ding et al., Ultra-wide Band Signal Generation Using a Silicon Micro-ring Resonator, IEEE Photonic Society 24th Annual Meeting, IEEE, Oct. 9, 2011, TuI2,2 pages.

*Primary Examiner* — Dibson J Sanchez
(74) *Attorney, Agent, or Firm* — Rimon PC (57) ABSTRACT

An ADD/DROP filter and an optical add/drop multiplexer are disclosed. An ADD/DROP filter includes an input port, an output port, an add port connecting to a modulator, and a drop port. The modulator is configured to load a pilot signal to a first optical signal to obtain a second optical signal, and transmit the second optical signal to the add port. A third optical signal is input to the input port. A wavelength difference between the second optical signal and the third optical signal is an integral multiple of a free spectral range. A power detector is connected to the output port and/or the drop port. The power detector is configured to obtain an output optical signal from the output port or the drop port and detect an optical power of the output optical signal.

10 Claims, 7 Drawing Sheets

(58) Field of Classification Search
USPC .................................................. 398/43–103
See application file for complete search history.

(56) References Cited

U.S. PATENT DOCUMENTS

| | | | |
|---|---|---|---|
| 6,826,326 | B1 | 11/2004 | Meyer |
| 7,616,850 | B1* | 11/2009 | Watts ..................... G02F 1/225 |
| | | | 385/32 |
| 7,903,910 | B2 | 3/2011 | Chu et al. |
| 2002/0076149 | A1* | 6/2002 | Deacon .................. G02F 1/011 |
| | | | 385/27 |
| 2003/0223745 | A1 | 12/2003 | Tomofuji et al. |
| 2004/0228630 | A1 | 11/2004 | Kim et al. |
| 2007/0264008 | A1 | 11/2007 | Zaacks et al. |
| 2007/0280700 | A1* | 12/2007 | Remedios ........... H04J 14/0298 |
| | | | 398/183 |
| 2009/0196603 | A1* | 8/2009 | Zhou .................. H04B 10/0773 |
| | | | 398/32 |
| 2010/0183312 | A1* | 7/2010 | Bolla ................ G02B 6/29395 |
| | | | 398/85 |
| 2010/0209038 | A1* | 8/2010 | Popovic ............. G02B 6/12007 |
| | | | 385/1 |
| 2013/0161496 | A1* | 6/2013 | Akiyama ............... G02F 1/3132 |
| | | | 250/227.23 |
| 2015/0222354 | A1* | 8/2015 | Shang .............. H04B 10/25891 |
| | | | 398/26 |
| 2015/0323818 | A1 | 11/2015 | Padmaraju et al. |
| 2017/0155451 | A1 | 6/2017 | Hayakawa |
| 2017/0237517 | A1 | 8/2017 | Wei |

FOREIGN PATENT DOCUMENTS

| | | |
|---|---|---|
| CN | 101040473 A | 9/2007 |
| CN | 101840029 A | 9/2010 |
| CN | 104297947 A | 1/2015 |
| CN | 104931081 A | 9/2015 |
| CN | 205157831 U | 4/2016 |
| JP | 2003513327 A | 4/2003 |
| JP | 2013005065 A | 1/2013 |
| WO | 2006018831 A1 | 2/2006 |
| WO | 2016065555 A1 | 5/2016 |
| WO | 2017019898 A1 | 2/2017 |

\* cited by examiner

ADD/DROP FILTER AND OPTICAL ADD/DROP MULTIPLEXER

CROSS-REFERENCE TO RELATED APPLICATIONS

This application is a continuation of International Patent Application No. PCT/CN2018/083036, filed on Apr. 13, 2018, which claims priority to Chinese Patent Application No. 201711148120.6, filed on Nov. 17, 2017. The disclosures of the aforementioned applications are hereby incorporated by reference in their entireties.

TECHNICAL FIELD

This application relates to the field of communications technologies, and in particular, to an ADD/DROP filter and an optical add/drop multiplexer.

BACKGROUND

An ADD/DROP filter is a key device in a fiber-dense wavelength division multiplexing system, and may implement adding and dropping of a particular wavelength or a particular wavelength combination in a primary fiber link. The ADD/DROP filter may use a fixed operating wavelength, for example, a filter based on a dielectric film, or may use a tunable operating wavelength, for example, a wavelength selective switch (WSS) filter based on a liquid crystal on silicon (LCOS).

By using integrated optics, an ADD/DROP filter with a tunable operating wavelength may also be implemented, and a more compact structure may be implemented. The ADD/DROP filter may be implemented by using different optical structures, for example, a Mach-Zehnder (MZ) structure, a gating structure, and a micro ring structure. Butterworth or Chebyshev type of filtering spectrum may be implemented by using a multi-micro ring cascaded structure. Using a micro ring filter as an example, when signals with a same wavelength are simultaneously input to an input port and an add port of the micro ring structure used for optical filtering, two input optical signals complement each other at an output port, so that a power of an optical signal at the output port cannot change with a resonant wavelength of the micro ring. In this case, closed-loop control cannot be performed on the resonant wavelength of the micro ring, resulting in that closed-loop control cannot be performed on the ADD/DROP filter.

SUMMARY

Embodiments of this application provide an ADD/DROP filter and an optical add/drop multiplexer, to implement closed-loop control on the ADD/DROP filter.

To resolve the foregoing technical problems, the embodiments of this application provide the following technical solutions:

According to a first aspect, an embodiment of this application provides an ADD/DROP filter, including: the ADD/DROP filter includes: an input port, an output port, an add port, and a drop port; the add port is connected to a modulator, a first optical signal and a pilot signal are separately input to the modulator, and the modulator is configured to: load the pilot signal to the first optical signal to obtain a second optical signal, and transmit the second optical signal to the add port; the second optical signal is input to the add port, a third optical signal is input to the input port, and a wavelength difference between the second optical signal and the third optical signal is an integral multiple of a free spectral range; and a power detector is connected to the output port and/or the drop port, and the power detector is configured to: obtain an output optical signal from the output port or the drop port and detect an optical power of the output optical signal.

In this embodiment of this application, the ADD/DROP filter includes the input port, the output port, the add port, and the drop port. The add port is connected to the modulator. The first optical signal and the pilot signal are separately input to the modulator. The modulator is configured to: load the pilot signal to the first optical signal to obtain the second optical signal, and transmit the second optical signal to the add port. Therefore, the second optical signal may be input to the add port, the third optical signal is input to the input port, and the wavelength difference between the second optical signal and the third optical signal is the integral multiple of the free spectral range. In addition, the power detector is connected to the output port and/or the drop port of the ADD/DROP filter provided in this embodiment of this application. The power detector is configured to: obtain the output optical signal from the output port or the drop port and detect the optical power of the output optical signal. In this embodiment of this application, the second optical signal is input to the add port of the ADD/DROP filter, the second optical signal is obtained by loading the pilot signal on the first optical signal, and therefore the first optical signal from the add port can be separated at the drop port or the output port. In this way, the measured optical power can be locked at the output port or the drop port without being affected by the third optical signal input to the input port. Therefore, the wavelength of the ADD/DROP filter can be locked at an incident wavelength in real time to implement closed-loop control on the ADD/DROP filter.

In a possible design of the first aspect of this application, the ADD/DROP filter further includes: an input/output waveguide, an annular waveguide, an ADD/DROP waveguide, and a first micro heater. The first micro heater is disposed around the annular waveguide. The input/output waveguide includes: the input port and the output port. The input/output waveguide and the annular waveguide form a first coupler at a first coupling position. The annular waveguide and the ADD/DROP waveguide form a second coupler at a second coupling position. The ADD/DROP waveguide includes: the add port and the drop port. The first micro heater is disposed around the annular waveguide. The input/output waveguide includes: the input port and the output port. The ADD/DROP waveguide includes: the add port and the drop port. To be specific, four ports of the ADD/DROP filter may be implemented by the ports of the input/output waveguide and the ADD/DROP waveguide. The input/output waveguide and the annular waveguide form the first coupler at the first coupling position, and the annular waveguide and the ADD/DROP waveguide form the second coupler at the second coupling position. The ADD/DROP filter in this structure may implement closed-loop control on the ADD/DROP filter by adjusting a voltage or a current of the first micro heater.

In a possible design of the first aspect of this application, the ADD/DROP filter further includes: an optical splitter. The input/output waveguide is connected to the power detector through the optical splitter; or the ADD/DROP waveguide is connected to the power detector through the optical splitter. The optical splitter is a passive component, also referred to as a light splitter, does not need external energy, and can implement an optical splitting function provided that there is input light. Optionally, the input/output waveguide may be directly connected to the power detector without using an optical splitter, and the ADD/DROP waveguide may be directly connected to the power detector without using an optical splitter.

In a possible design of the first aspect of this application, that the input/output waveguide and the annular waveguide form the first coupler at the first coupling position includes: the input/output waveguide and the annular waveguide form a tunable coupler at the first coupling position. A coupling coefficient of the first coupler can be adjusted by controlling the current or the voltage of the first micro heater.

In a possible design of the first aspect of this application, the ADD/DROP filter further includes: a second micro heater. The second micro heater is disposed around the input/output waveguide. The second micro heater is configured to adjust the coupling coefficient of the tunable coupler to be 0. The input/output waveguide is further configured to output the third optical signal through the output port when the coupling coefficient of the tunable coupler is adjusted to be 0. The first micro heater is configured to set a resonant wavelength of the ADD/DROP filter to a target operating wavelength by adjusting the current or the voltage of the first micro heater. The second micro heater is configured to restore the coupling coefficient of the tunable coupler to a target value. Adjustment on the resonant wavelength of the ADD/DROP filter may be completed by controlling the second micro heater and the first micro heater, thereby implementing closed-loop control on the ADD/DROP filter.

In a possible design of the first aspect of this application, that the input/output waveguide and the annular waveguide form the first coupler at the first coupling position includes: the input/output waveguide and the annular waveguide form a directional coupler or a multimode interference coupler at the first coupling position.

In a possible design of the first aspect of this application, the annular waveguide includes: N cascaded annular waveguides coupled to each other, where N is a positive integer greater than or equal to 2. The first micro heater includes: N micro heaters respectively disposed around the N cascaded annular waveguides. The N micro heaters are configured to set the resonant wavelength of the ADD/DROP filter to the target operating wavelength by asynchronously adjusting currents or voltages of the corresponding micro heaters.

In a possible design of the first aspect of this application, the first optical signal and the pilot signal are generated by a same optical signal generator. In this embodiment of this application, the first optical signal and the pilot signal may be generated by using one optical signal generator, so that an original optical signal generator that generates a service optical signal is used, and no pilot signal generator needs to be independently disposed.

In a possible design of the first aspect of this application, bit information is loaded on the pilot signal. The pilot signal is not only used for modulation with the first optical signal, but also used for secondary modulation. The bit information is loaded on the pilot signal. The bit information may be used to implement control on the ADD/DROP filter. Therefore, by loading the bit information on the pilot signal, overheads of control signaling can be reduced and utilization of the pilot signal can be improved.

According to a second aspect, an embodiment of this application further provides an optical add/drop multiplexer. The optical add/drop multiplexer includes: the ADD/DROP filter, the modulator, and the power detector according to any one of the first aspect, and a controller. The controller is connected to the modulator, the ADD/DROP filter, and the power detector. The modulator is connected to the add port of the ADD/DROP filter. The power detector is connected to the output port and/or the drop port of the ADD/DROP filter. The controller is configured to: load, by using the modulator, a pilot signal to a first optical signal to obtain a second optical signal, and transmit the second optical signal to the add port of the ADD/DROP filter. The power detector is configured to: obtain an output optical signal from the output port or the drop port of the ADD/DROP filter and detect an optical power of the output optical signal.

In a possible design of the second aspect of this application, the controller is further configured to demodulate, at a preset frequency, an optical power of an optical signal corresponding to the frequency. The controller may be further configured to demodulate the optical signal to obtain the optical power of the preset frequency, thereby performing optical power analysis.

In a possible design of the second aspect of this application, the optical add/drop multiplexer includes M cascaded ADD/DROP filters, where M is a positive integer greater than or equal to 1.

In a possible design of the second aspect of this application, the ADD/DROP filter further includes: a micro heater. The controller is further configured to adjust a current or a voltage of the micro heater. The ADD/DROP filter is further configured to set a resonant wavelength to a target operating wavelength based on an adjusted current or voltage of the micro heater. The controller may adjust the current or the voltage of the micro heater, so that the ADD/DROP filter may set the resonant wavelength to the target operating wavelength based on the adjusted current or voltage of the micro heater, thereby implementing wavelength switching of the ADD/DROP filter.

DESCRIPTION OF EMBODIMENTS

Embodiments of this application provide an ADD/DROP filter and an optical add/drop multiplexer, capable of implementing closed-loop control on the ADD/DROP filter.

The following describes the embodiments of this application with reference to the accompanying drawings.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

An ADD/DROP filter (ADF) provided in the embodiments of this application may also be referred to as a micro ring filter. That is, a micro ring structure used for optical filtering is disposed in the ADD/DROP filter. An ADD/DROP filter provided in the embodiments of this application may include: an input port, an output port, an add port, and a drop port. The input port and the add port may each be configured to input an optical signal, and the output port and the drop port may be configured to output the optical signals. The output port of the ADD/DROP filter may also be referred to as a through port. When optical signals with a same wavelength are simultaneously input to the input port and the add port, the optical signals from the input port and the add port are superposed with each other at the through port or the drop port. To be specific, when the two input optical signals have the same power, the power of the output optical signals complement each other, and an optical power at the through port or the drop port does not change with a resonant wavelength of a micro ring. Therefore, closed-loop control on the resonant wavelength of the micro ring cannot be performed by using a total optical power at the drop port or the through port as a feedback quantity. The ADD/DROP filter provided in the embodiments of this application may separate the input optical signals at the through port or the drop port, so that a measured optical power can be locked at the output port or the drop port without being affected by the optical signal input to the input port. Therefore, the wavelength of the ADD/DROP filter can be locked at an incident wavelength in real time to implement closed-loop control on the ADD/DROP filter.

Figure 1:
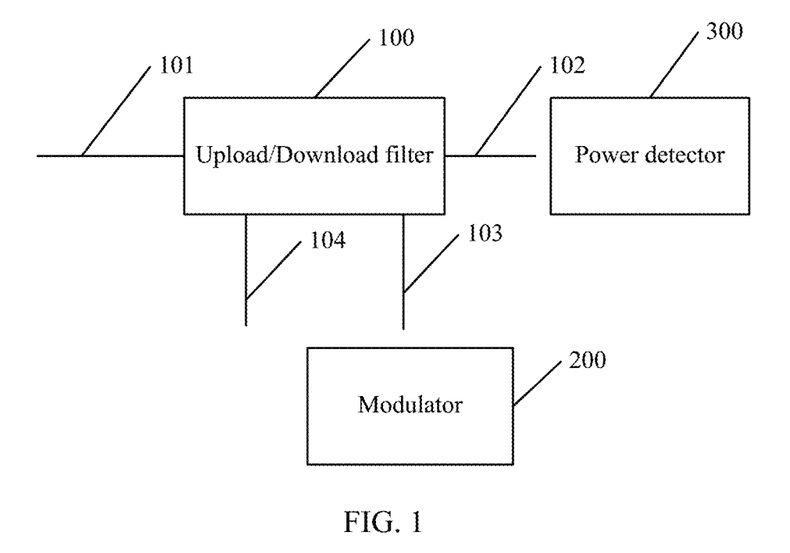
FIG. 1 is a schematic diagram of a connection relationship of an ADD/DROP filter according to an embodiment of this application.

The ADD/DROP filter provided in the embodiments of this application is described in detail below. Referring to FIG. 1, an embodiment of this application provides an ADD/DROP filter 100. The ADD/DROP filter 100 includes: an input port 101, an output port 102, an add port 103, and a drop port 104.

The add port 103 is connected to a modulator 200. A first optical signal and a pilot signal are separately input to the modulator 200. The modulator 200 is configured to: load the pilot signal to the first optical signal to obtain a second optical signal, and transmit the second optical signal to the add port 103.

The second optical signal is input to the add port 103. A third optical signal is input to the input port 101. A wavelength difference between the second optical signal and the third optical signal is an integral multiple of a free spectral range.

A power detector 300 is connected to the output port 102 and/or the drop port 104. The power detector 300 is configured to: obtain an output optical signal from the output port 102 or the drop port 104 and detect an optical power of the output optical signal.

The ADD/DROP filter 100 provided in the embodiments of this application is provided with four ports, which are respectively defined as: the input port 101, the output port 102, the add port 103, and the drop port 104. The input port and the add port may each be configured to input an optical signal, and the output port and the drop port may be configured to output the optical signals. The add port provided in the embodiments of this application is connected to the modulator 200, and the modulator 200 may also be referred to as an optical modulator. The modulator 200 is provided with an input port and an output port. The first optical signal and the pilot signal are separately input to the input port of the modulator 200, and the output port of the modulator 200 is connected to the add port 103 of the ADD/DROP filter 100. The modulator 200 may implement modulation on the first optical signal, and the first optical signal is a service signal that needs to be input to the ADD/DROP filter 100. Specifically, the modulator 200 may load the pilot signal to the first optical signal to obtain the second optical signal. The pilot signal is loaded to the first optical signal by using the modulator 200, and the obtained second optical signal has a same wavelength as the first optical signal. The pilot signal is a signal sent for measurement or monitoring. The pilot signal usually has a single frequency, to facilitate detection and identification. The modulator 200 transmits the second optical signal to the add port 103 through the output port of the modulator 200. Therefore, the second optical signal may be input to the add port 103 by using the modulator 200.

To distinguish between the optical signals at the different ports of the ADD/DROP filter, an optical signal input to the input port 101 is defined as a "third optical signal". A wavelength difference between the second optical signal and the third optical signal is an integral multiple of a free spectral range. The free spectral range is a range of frequencies or wavelengths of light that can be measured by the ADD/DROP filter. The wavelength difference between the second optical signal and the third optical signal is the integral multiple of the free spectral range. For example, the wavelength difference between the second optical signal and the third optical signal is equal to 0. That is, the second optical signal and the third optical signal may have a same wavelength. For another example, the wavelength difference between the second optical signal and the third optical signal is equal to free spectral range. This is only an example herein, and is not used to limit the ADD/DROP filter provided in the embodiments of this application.

It should be noted that in the prior art, when the optical signal input to the add port and the optical signal input to the input port of the ADD/DROP filter have a same wavelength, powers of the two input signals exactly complement each other at the two output ports. The power at the through port or the drop port does not change with the resonant wavelength of the micro ring. Consequently, closed-loop control cannot be performed on the resonant wavelength of the micro ring. In the embodiments of this application, the wavelength difference between the second optical signal input to the add port and the third optical signal input to the input port of the ADD/DROP filter is the integral multiple of the free spectral range. To resolve a problem that closed-loop control cannot be performed on the ADD/DROP filter, the ADD/DROP filter is connected to the modulator. The modulator loads the pilot signal on the first optical signal, so that the first optical signal and the third optical signal that is input to the input port are separated at the two output ports. In this way, the first optical signal can be correctly identified, and therefore closed-loop control on the ADD/DROP filter is implemented.

Figure 2:
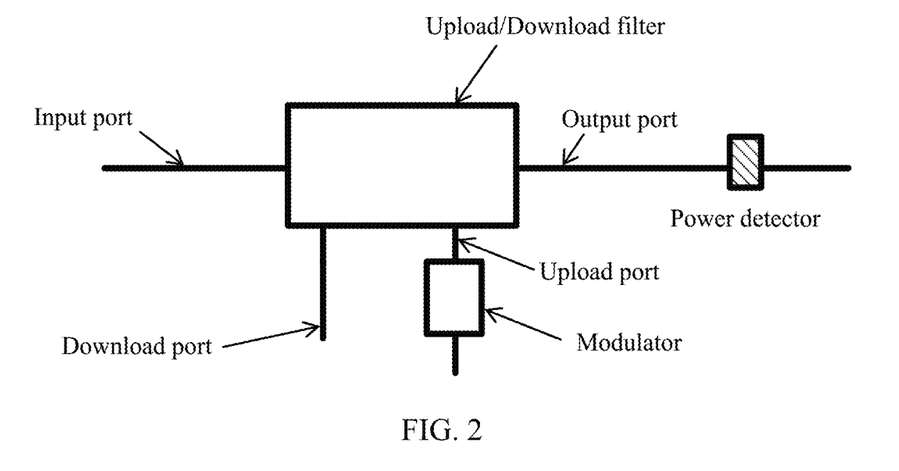
FIG. 2 is a schematic diagram of a connection relationship between an add port and an output port of the ADD/DROP filter according to an embodiment of this application.
Figure 3:
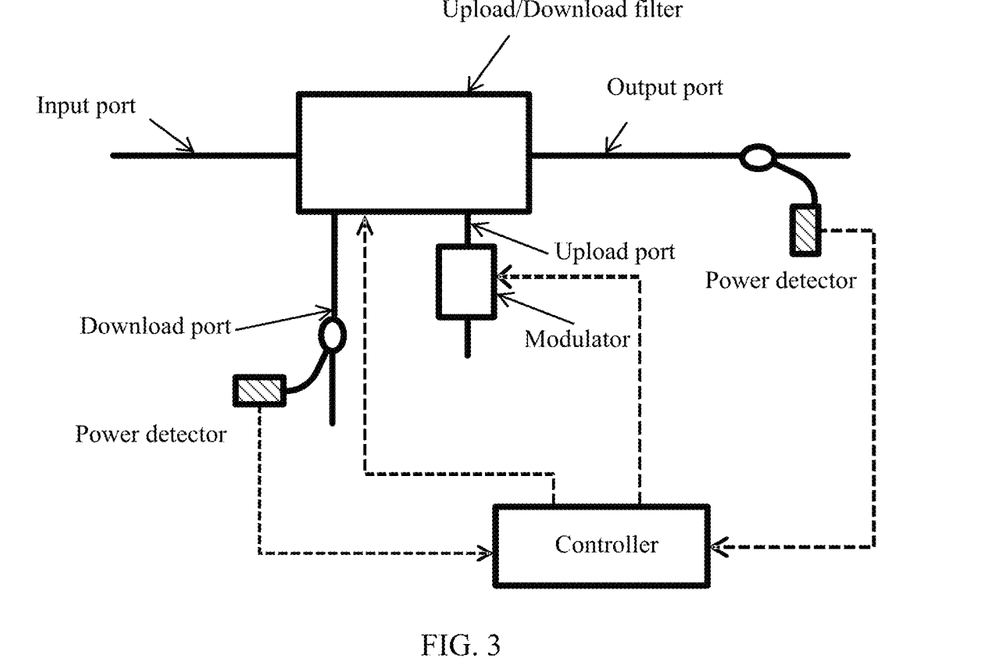
FIG. 3 is another schematic diagram of a connection relationship between the add port and the output port of the ADD/DROP filter according to an embodiment of this application.

In the embodiments of this application, the power detector is connected to the output port and/or the drop port of the ADD/DROP filter. For example, as shown in FIG. 2, the power detector may be connected to the output port 10, or the power detector is connected to the drop port. Alternatively, as shown in FIG. 3, the output port and the drop port are each connected to one power detector. It should be noted that, if the output port and the drop port are respectively connected to respective power detectors, only one of the two power detectors needs to be used. In the embodiments of this application, the ADD/DROP filter is connected to the power detector. The power detector may also be referred to as an optical power detector and may be configured to: obtain an output optical signal from the output port or the drop port and detect an optical power of the output optical signal. For example, if the drop port is connected to a power detector, the power detector detects a total power of the optical signals output from the drop port 104, that is, a total optical power of the second optical signal and the third optical signal at the drop port.

It should be noted that, in FIG. 3, the output port and the drop port are each connected to one power detector. In FIG. 3, the two power detectors and the modulator are separately connected to a controller. The controller is configured to: load, by using the modulator, a pilot signal to a first optical signal to obtain a second optical signal, and transmit the second optical signal to the add port of the ADD/DROP filter. In addition, the controller is further configured to control the two power detectors to detect an output optical power. In addition, the controller is further configured to control the ADD/DROP filter, to adjust a resonant wavelength of the ADD/DROP filter. For details, refer to detailed descriptions of the controller in subsequent embodiments.

An application scenario of the ADD/DROP filter provided in the embodiments of this application is described below. The ADD/DROP filter may include: two parallel straight waveguides and an annular waveguide coupled to the two parallel straight waveguides. Two ports of one of the straight waveguides are respectively an input port and an output port, and two ports of the other straight waveguide are respectively an add port and a drop port. The two straight waveguides are also referred to as guiding waveguides or port waveguides, and may be coupled to a micro ring by using a directional coupler or a multimode interference (MMI) coupler. For example, the directional coupler may implement coupling between the straight waveguides and the annular waveguide based on an evanescent wave principle.

Figure 4:
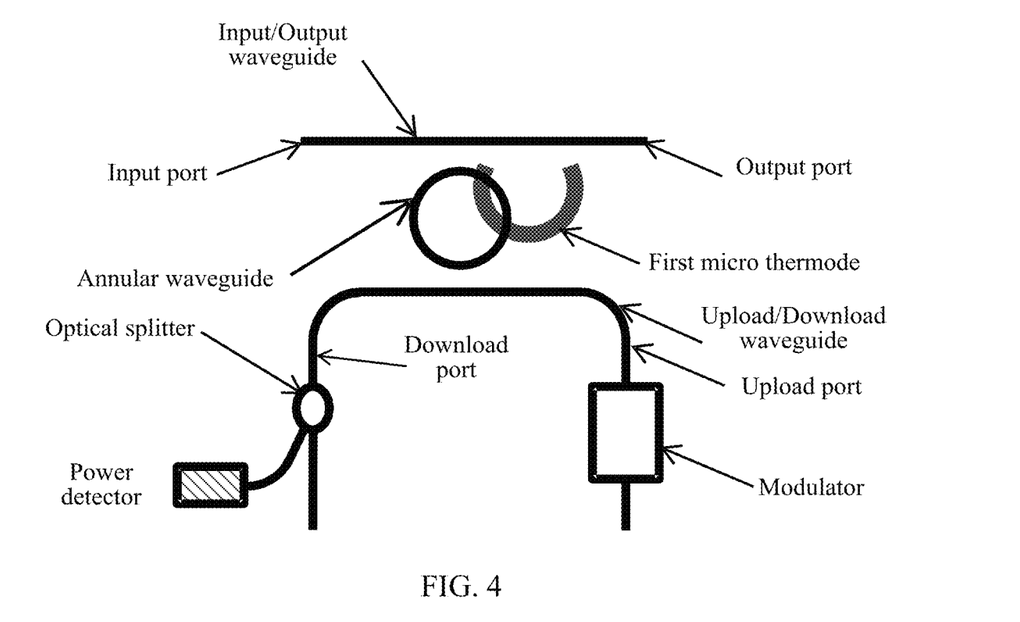
FIG. 4 is a schematic structural diagram of composition of the ADD/DROP filter according to an embodiment of this application.

In some embodiments of this application, for the ADD/DROP filter implemented by using integrated optics, both a device process tolerance and a working environment change, for example, a working temperature and a laser wavelength drift, affect actual application of the ADD/DROP filter. An embodiment of this application further provides an ADD/DROP filter. A micro heater is integrated around a waveguide of the ADD/DROP filter. An optical power of a specific port of the filter is measured in a light-pass state. A voltage or a current of the micro heater is adjusted in a closed loop manner by using a specific algorithm, so that a local temperature of the micro ring is controlled, thereby implementing stable control on a filtering spectrum type and an operating wavelength of the integrated optical filter. Referring to FIG. 4, the ADD/DROP filter further includes: an input/output waveguide, an annular waveguide, an ADD/DROP waveguide, and a first micro heater.

The first micro heater is disposed around the annular waveguide.

The input/output waveguide includes: an input port and an output port.

The input/output waveguide and the annular waveguide form a first coupler at a first coupling position.

The annular waveguide and the ADD/DROP waveguide form a second coupler at a second coupling position.

The ADD/DROP waveguide includes: an add port and a drop port.

The first micro heater is disposed around the annular waveguide. For example, the first micro heater may be disposed in a same plane as the annular waveguide, or the first micro heater may be located in a plane different from the annular waveguide, provided that the first micro heater is disposed around the annular waveguide. In FIG. 4, that the first micro heater may be located in a plane different from the annular waveguide is used as an example for description. The input/output waveguide and the ADD/DROP waveguide may be the two straight waveguides in the foregoing embodiment. The input/output waveguide includes: an input port and an output port, and the ADD/DROP waveguide includes: an add port and a drop port. That is, the four ports of the ADD/DROP filter may be implemented by the ports of the input/output waveguide and the ADD/DROP waveguide.

As shown in FIG. 4, the input/output waveguide and the annular waveguide form the first coupler at the first coupling position, and the annular waveguide and the ADD/DROP waveguide form the second coupler at the second coupling position. The descriptions are provided below by using an example. Optical signals $\lambda 1$, $\lambda 2$, and $\lambda 3$ of three wavelengths are input from the input port and an optical signal $\lambda A$ of one wavelength is input from the add port. $\lambda 2$ and $\lambda A$ meet a resonant condition of the micro ring, that is, $2 \times pi \times R \times Neff = m\lambda$, where m is an integer, R is a radius of the annular waveguide, and Neff is an effective refractive index of the annular waveguide. An optical signal meeting the resonant condition constructively interferes in the micro ring and when the optical signal is input from a port of one waveguide, the optical signal is output from a corresponding port of another waveguide. When an incident wavelength meets a micro ring resonant condition, a possible combination of input and output ports is: from the input port to the drop port, or from the add port to the output port. As shown in FIG. 4, the optical signal with the wavelength $\lambda 2$ input from the input port is output from a drop port of another waveguide, and the optical signal with the wavelength $\lambda A$ input from the add port is output from the output port. Similarly, an optical signal that does not meet the resonant condition destructively interferes in the micro ring, and is output from another port of a same waveguide. If $\lambda 1$ and $\lambda 3$ do not meet the resonant condition, $\lambda 1$ and $\lambda 3$ are input from the input port and are directly output from the output port of a same waveguide.

It should be noted that, tuning of the resonant wavelength of the micro ring is used for manufacturing a material of the optical waveguide. For example, a dielectric material (silicon dioxide, or silicon nitride) or a semiconductor material (a III-V material, or a silicon material) has a thermo-optical effect. Therefore, an effective refractive index of a waveguide may be changed by controlling a local temperature of a micro ring, thereby changing a resonant wavelength of the micro ring. For example, in the embodiments of this application, the micro heater is integrated above the annular waveguide, and the local temperature of the micro ring is changed by controlling the voltage or the current of the micro heater.

In some embodiments of this application, the ADD/DROP filter further includes an optical splitter. The input/output waveguide is connected to the power detector through the optical splitter; or the ADD/DROP waveguide is connected to the power detector through the optical splitter. As shown in FIG. 4, an example in which the drop port is connected to the power detector through the optical splitter is used for description. The optical splitter is a passive component, also referred to as a light splitter, does not need external energy, and can implement an optical splitting function provided that there is input light. Optionally, in some embodiments of this application, the input/output waveguide may not use the optical splitter and directly use an optical power detector that does not split light, and likewise, the ADD/DROP waveguide may not use the optical splitter and be directly connected to the optical power detector that does not split light. The optical power detector that does not split light directly integrates a component having an optical power detection function and the optical waveguide, thereby directly detecting, without the optical splitter, the power of the optical signal passing through the waveguide.

In some embodiments of this application, that the input/output waveguide and the annular waveguide form the first coupler at the first coupling position includes:

the input/output waveguide and the annular waveguide form a tunable coupler at the first coupling position.

Figure 5:
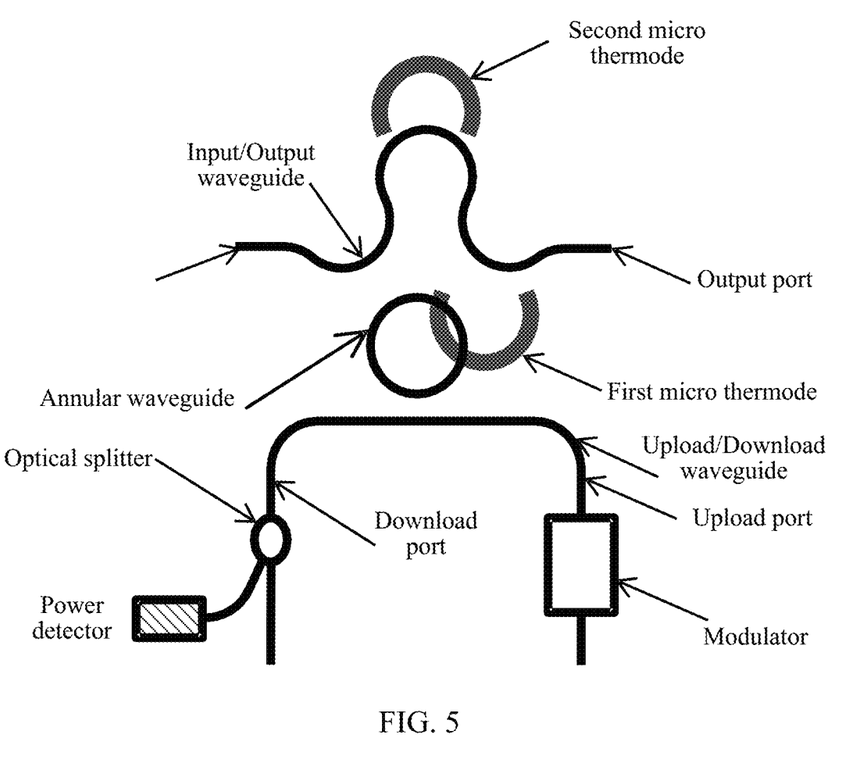
FIG. 5 is another schematic structural diagram of composition of the ADD/DROP filter according to an embodiment of this application.

As shown in FIG. 5, the input/output waveguide may further include two arc-shaped waveguides. The two arc-shaped waveguides each form the first coupling position with the annular waveguide. Then, the controller may implement adjustment on a coupling coefficient of a first coupler by controlling a current or a voltage of the first micro heater, and therefore, the first coupler is specifically a tunable coupler.

In some embodiments of this application, the ADD/DROP filter further includes: a second micro heater, where the second micro heater is disposed around the input/output waveguide.

The second micro heater is configured to adjust the coupling coefficient of the tunable coupler to be 0.

The input/output waveguide is further configured to output a third optical signal through the output port 102 when the coupling coefficient of the tunable coupler is adjusted to be 0.

The first micro heater is configured to set the resonant wavelength of the ADD/DROP filter to a target operating wavelength by adjusting the current or the voltage of the first micro heater.

The second micro heater is configured to restore the coupling coefficient of the tunable coupler to a target value.

As shown in FIG. 5, the second micro heater is disposed around the input/output waveguide. For example, the second micro heater may be disposed in a same plane as the input/output waveguide, or the second micro heater may be located in a plane different from the input/output waveguide, provided that the second micro heater is disposed around the input/output waveguide. In FIG. 5, an example in which the second micro heater may be located in a same plane as the input/output waveguide is used for description. The input/output waveguide includes an input port and an output port, and the ADD/DROP waveguide includes an add port and a drop port. That is, the four ports of the ADD/DROP filter may be implemented by the ports of the input/output waveguide and the ADD/DROP waveguide. As shown in FIG. 5, the input/output waveguide may further include two arc-shaped waveguides. The two arc-shaped waveguides each form the first coupling position with the annular waveguide.

Adjustment on the resonant wavelength of the ADD/DROP filter may include the following process: First, the second micro heater adjusts the coupling coefficient of the tunable coupler to be 0, and when the coupling coefficient of the tunable coupler is adjusted to be 0, the input/output waveguide outputs the third optical signal through the output port. In this case, an association between the input/output waveguide and the annular waveguide may be disconnected, and the optical signals of all wavelengths that are input from the input port are directly output from the output port. Next, the first micro heater may be controlled to adjust a current or a voltage of the first micro heater. The resonant wavelength of the ADD/DROP filter is set to the target operating wavelength. Finally, the second micro heater is controlled to restore the coupling coefficient of the tunable coupler to the target value. The tunable coupler has two states defined as "on" and "off". The coupling coefficient corresponding to the "off" state is 0, and the coupling coefficient corresponding to the "on" state is a target value that is not zero. In a working principle, the value should be equal to the coupling coefficient between a last annular waveguide and the ADD/DROP waveguide.

In some embodiments of this application, that the input/output waveguide and the annular waveguide form the first coupler at the first coupling position includes:

the input/output waveguide and the annular waveguide form the directional coupler or the multimode interference coupler at the first coupling position.

As shown in FIG. 4, the input/output waveguide may be a straight waveguide. The input/output waveguide and the annular waveguide form the directional coupler or the multimode interference coupler at the first coupling position. No micro heater is disposed around the input/output waveguide, and the first micro heater is disposed around the annular waveguide. Therefore, the coupling coefficient between the input/output waveguide and the annular waveguide is fixed and does not need to be adjusted.

Figure 6:
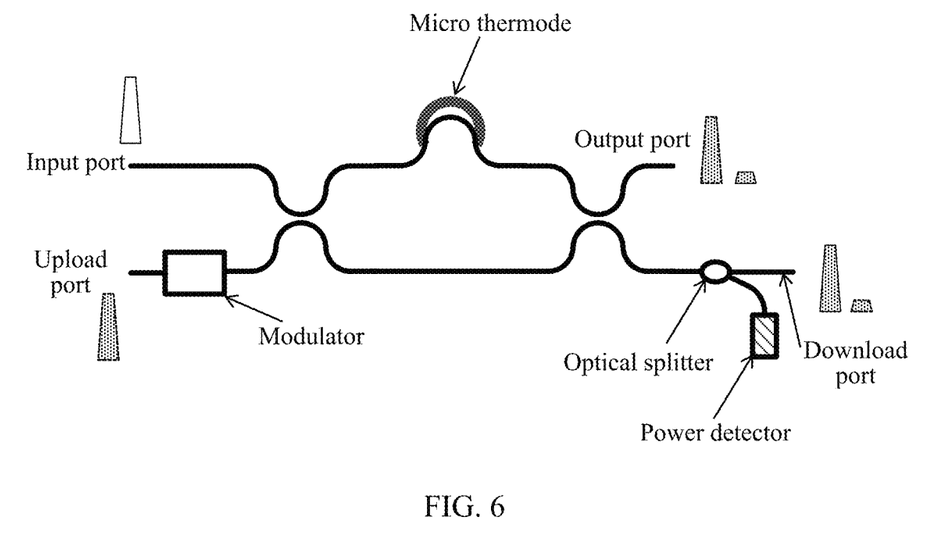
FIG. 6 is another schematic structural diagram of composition of the ADD/DROP filter according to an embodiment of this application.

In some embodiments of this application, as shown in FIG. 6, optical signals are respectively input to the input port and the add port of the ADD/DROP filter. A micro heater is disposed around an upper-modulated arm waveguide of the ADD/DROP filter, and the operating wavelength of the ADD/DROP filter is adjusted by adjusting a current or a voltage of the micro heater.

Figure 7:
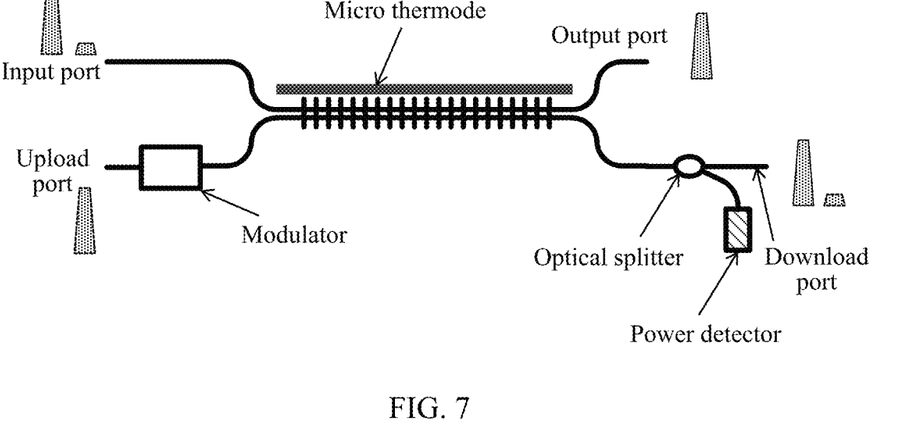
FIG. 7 is another schematic structural diagram of composition of the ADD/DROP filter according to an embodiment of this application.
Figure 8:
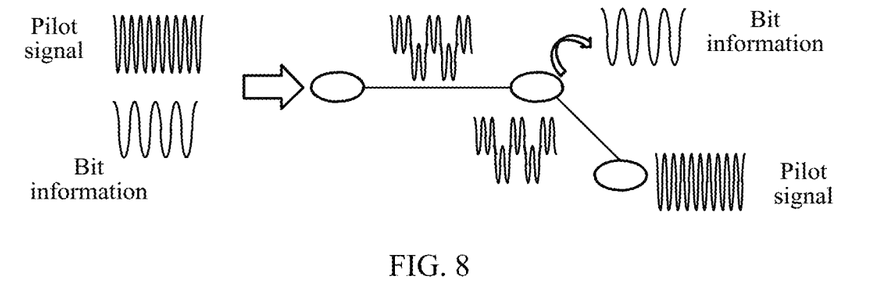
FIG. 8 is another schematic structural diagram of composition of the ADD/DROP filter according to an embodiment of this application.

As shown in FIG. 7, the input port and the add port of the ADD/DROP filter respectively output optical signals. A micro heater is disposed around a gating of the ADD/DROP filter, and the operating wavelength of the ADD/DROP filter is adjusted by adjusting a current or a voltage of the micro heater.

In some embodiments of this application, the annular waveguide includes: N cascaded annular waveguides coupled to each other, where N is a positive integer greater than or equal to 2.

The first micro heater includes: N micro heaters respectively disposed around the N cascaded annular waveguides.

The N micro heaters are configured to: set the resonant wavelength of the ADD/DROP filter to the target operating wavelength by asynchronously adjusting currents or voltages of the corresponding micro heaters.

When the annular waveguide in the ADD/DROP filter is formed by the N cascaded annular waveguides coupled to each other, the N micro heaters are disposed around the N cascaded annular waveguides. To be specific, one micro heater is disposed around one cascaded annular waveguide, so that by adjusting one micro heater, a cascaded annular waveguide corresponding to the micro heater can be controlled. Therefore, through asynchronous tuning of N micro rings (a quantity N of the micro rings is greater than or equal to 2), hitless switching of the wavelengths of the ADD/DROP filter can be implemented.

In some embodiments of this application, the first optical signal and the pilot signal are generated by a same optical signal generator. To be specific, the first optical signal and the pilot signal may be generated by using one optical signal generator, so that an original optical signal generator that generates a service optical signal is used, and no pilot signal generator needs to be independently disposed.

In some embodiments of this application, bit information is loaded on the pilot signal. To be specific, the pilot signal is not only used for modulation with the first optical signal, but also used for secondary modulation. The bit information is loaded on the pilot signal. The bit information may be used to implement monitoring on a service signal passing through the ADD/DROP filter. Therefore, by loading the bit information on the pilot signal, overheads of control signaling can be reduced and utilization of the pilot signal can be improved.

It can be learned from the examples in the foregoing embodiments of this application that the ADD/DROP filter includes the input port, the output port, the add port, and the drop port. The add port is connected to the modulator. The first optical signal and the pilot signal are separately input to the modulator. The modulator is configured to: load the pilot signal to the first optical signal to obtain the second optical signal, and transmit the second optical signal to the add port. Therefore, the second optical signal may be input to the add port, the third optical signal is input to the input port, and the wavelength difference between the second optical signal and the third optical signal is the integral multiple of the free spectral range. In addition, the power detector is connected to the output port and/or the drop port of the ADD/DROP filter provided in the embodiments of this application. The power detector is configured to: obtain the output optical signal from the output port or the drop port and detect the optical power of the output optical signal. In the embodiments of this application, the second optical signal is input to the add port of the ADD/DROP filter, and the second optical signal is obtained by loading the pilot signal on the first optical signal, so that the first optical signal from the add port can be separated at the drop port or the output port. In this way, the measured optical power can be locked at the output port or the drop port without being affected by the third optical signal input to the input port. Therefore, the wavelength of the ADD/DROP filter can be locked at the incident wavelength in real time, to implement closed-loop control on the ADD/DROP filter.

For better understanding and implementation of the foregoing solutions of the embodiments of this application, specific descriptions are provided below by using a corresponding application scenario as an example.

In the ADD/DROP filter provided in the embodiments of this application, when the signals of the same wavelength are synchronously input to the input port and the add port, the signals from the input port and the add port are superposed with each other at the output port or the drop port. The two input signals, when having a same power, exactly complement each other at the two output ports, and the power at the output port or the drop port does not change with the resonant wavelength of the micro ring. Therefore, closed-loop control on the resonant wavelength of the micro ring cannot be performed by using the total optical power of the drop port or the output port as the feedback quantity.

In the embodiments of this application, the pilot signal is introduced into the input signal at the add port, so that the signal from the add port can be separated at the drop port or the output port. In this way, the measured optical power may not be affected by the input port signal, and a maximum value is reached when the measured optical power is locked at the output port, or a minimum value is reached when the detected optical signal is locked at the drop port. Therefore, the wavelength of the ADD/DROP filter can be locked at the incident wavelength in real time.

Figure 9:
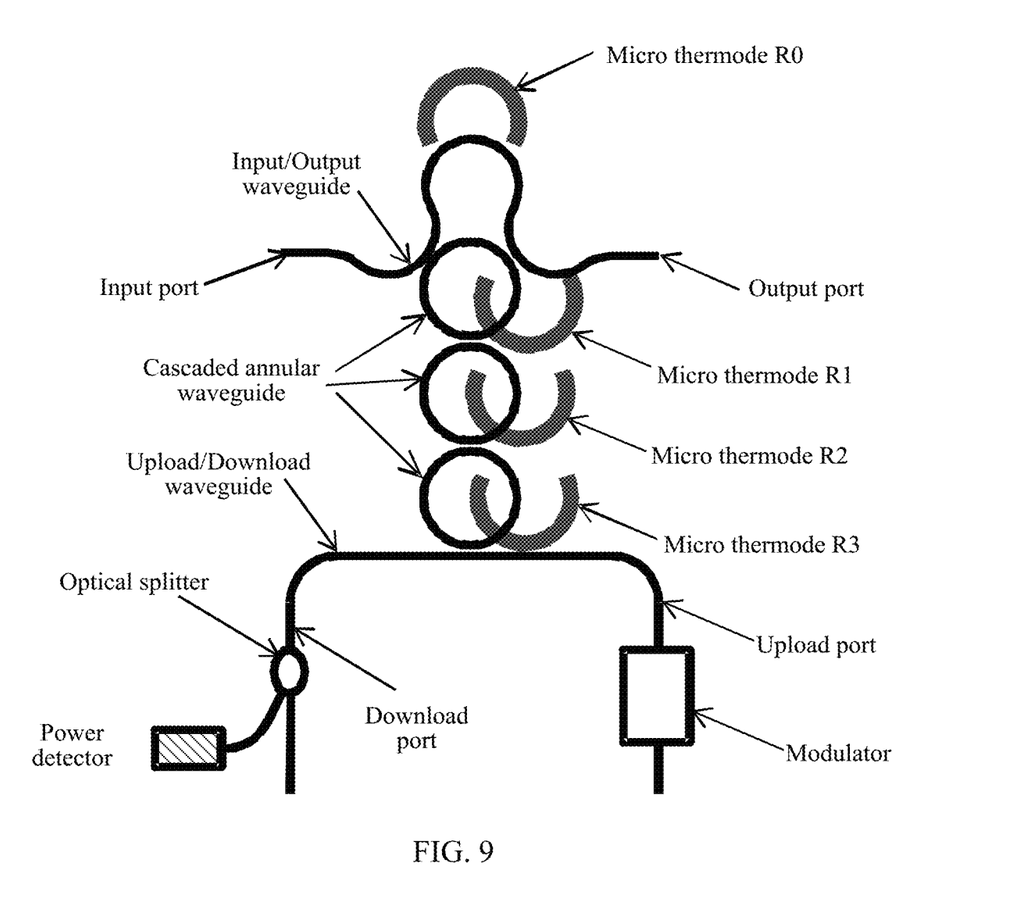
FIG. 9 is another schematic structural diagram of composition of the ADD/DROP filter according to an embodiment of this application.

As shown in FIG. 9, the ADD/DROP filter provided in the embodiments of this application includes: the input/output waveguide, the cascaded annular waveguides coupled to each other, the ADD/DROP waveguide, the modulator connected to the add port, and the optical power detector located at the drop port/output port. The tunable coupler is formed between the input/output waveguide and the annular waveguide. In FIG. 9, an example in which the annular waveguide is specifically three cascaded annular waveguides is used. One micro heater is disposed around each cascaded annular waveguide, and the micro heaters are respectively micro heaters R1, R2, and R3. A micro heater R0 is disposed around the input/output waveguide.

In the embodiments of this application, the service signal and the pilot signal of the add port may be used to implement spectrum shaping and wavelength control on the ADD/DROP filter. For example, for the spectrum shaping, the signal of the drop port or the output port is used as the feedback quantity, and spectrum shaping of the filter is implemented by searching for a maximum value or a minimum value through control of the three independent micro heaters.

Hitless switching of the operating wavelength is divided into four steps:

Step 10. The coupling coefficient between the input/output waveguide and the micro ring is adjusted to be 0 (an initial value is k0, where 0<k0<1). In this case, the association between the input/output waveguide and the micro ring filter is disconnected, and the optical signals of all wavelengths that are input from the input port are directly output from the Output port.

Step 11. Set the resonant wavelength of the ADD/DROP filter in an open-loop manner to be near a preset operating wavelength. For example, the resonant wavelength may be adjusted by querying a wavelength switching table.

Step 12. Restore the coupling coefficient between the input/output waveguide and the micro ring. For example, the coupling coefficient is k0, where 0<k0<1.

Step 13. Test a power of the optical signal at the drop port or the output port by using the optical power detector, demodulate the pilot signal from an obtained electrical signal to separate an optical power of an upload optical signal, and perform precise control on the operating wavelength of the micro ring in real time by using a maximum value or minimum value algorithm.

An initial state is that the ADD/DROP filter works normally in a current wavelength.

The following provides the descriptions by using an example as follows: the input/output waveguide is disconnected from the first annular waveguide. The disconnection is not a physical disconnection, but an optical disconnection. Voltages of the micro heater R1, the micro heater R2, and the micro heater R3 are set to voltages corresponding to the target wavelength. The voltages of the micro heaters are recovered, and then precise wavelength locking is performed.

The control step is described above. The foregoing modulator located at the add port is configured to load the pilot signal to the optical signal of the add port.

Figure 10:
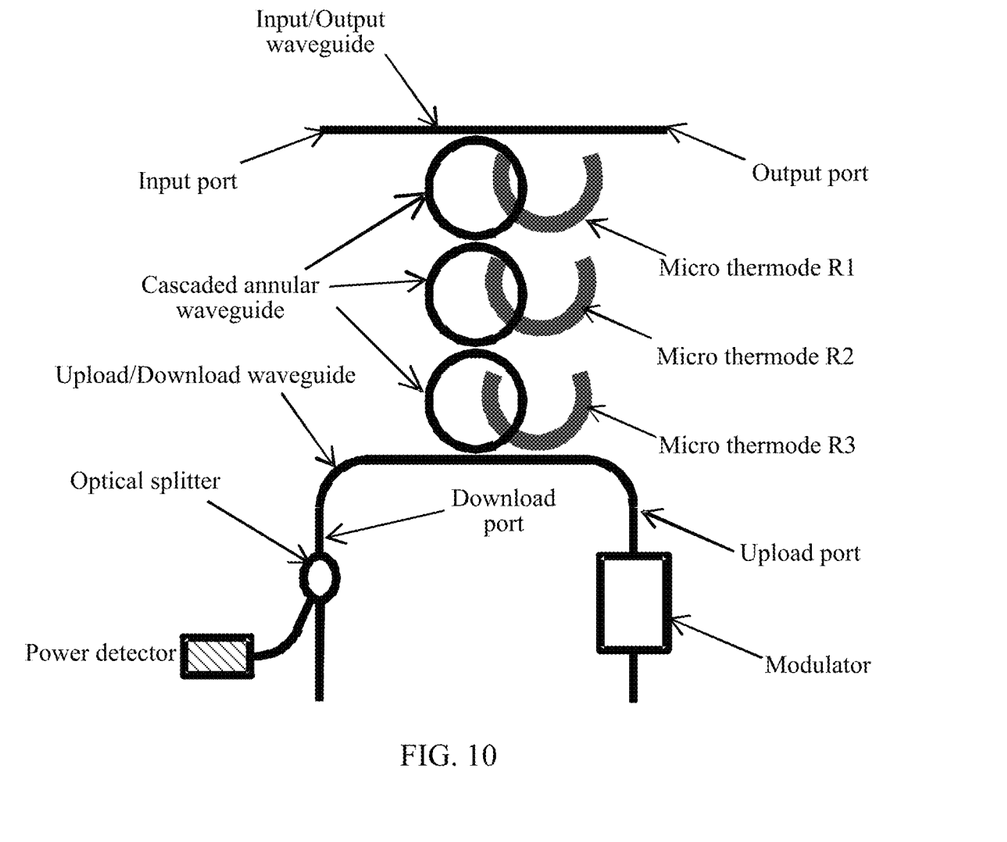
FIG. 10 is a schematic diagram of loading bit information on a pilot signal according to an embodiment of this application.

As shown in FIG. 10, the ADD/DROP micro ring resonator in the embodiments of this application includes: the input/output waveguide, the cascaded annular waveguides coupled to each other, the ADD/DROP waveguide, the modulator connected to the add port, and the power detector located at the drop port (or the output port). The structure allows two wavelength locking solutions: a maximum value locking solution (the power detector is located at the output port) and a minimum value locking solution (the power detector is located at the drop port). Using the maximum value locking as an example, the hitless wavelength switching process of wavelengths is described below.

Step 20. Input, at the add port, a service carrying a pilot signal.

Step 21. Detect an optical power and demodulate the pilot signal at the output port, to measure a power of an optical signal from the add port.

Step 22. Set a drive voltage or current of a micro heater of a micro ring in real time by using an algorithm such as a coordinate conversion algorithm by using the optical power from the add port as a feedback quantity, and lock a resonant wavelength of the micro heater at a current operating wavelength.

Step 23. Input a signal of another wavelength to the add port.

Step 24. Asynchronously set voltages of three micro heaters to a new target operating wavelength, and then repeat the foregoing locking process.

In the embodiments of this application, for the ADD/DROP filter, at a position at which the input/output waveguide is coupled to a first annular waveguide, there is a directional coupler with a fixed coupling coefficient, rather than a tunable coupler with a tunable coupling coefficient. The hitless wavelength switching in the foregoing embodiment is implemented by adjusting the coupling coefficient between the input/output waveguide and the first annular waveguide to be 0 by using the tunable coupler, then tuning all the resonant wavelengths of the micro ring portion, and subsequently recovering the tunable coupler. In this embodiment, the hitless wavelength switching is implemented by asynchronously tuning the N micro rings, where the quantity N of the micro rings is greater than or equal to 2.

In the foregoing two embodiments, the pilot signal is loaded to the service signal by using the modulator of the add port, and the pilot signal may alternatively be added at another node, for example, a board where the service signal is generated, of the ADD/DROP filter. Use of the pilot signal is not limited to an order of the micro ring, is not limited to whether there is the tunable coupler, and is not limited to whether the pilot signal is generated by using an independent modulator. For example, when the order of the micro ring is increased from 3 to 4, a control procedure in the embodiment shown in FIG. 9 does not change, but a voltage of one micro heater is added to a control quantity in a closed-loop control loop. For the embodiment shown in FIG. 10, during hitless switching of operating wavelengths, the first micro heater and the other micro heaters still need to be asynchronously adjusted to the target wavelength, and only the voltage of one micro heater is added to the control quantity.

In some embodiments of this application, an optical add/drop multiplexer based on the ADD/DROP filter is further provided. The optical add/drop multiplexer may include a plurality of cascaded ADD/DROP filters, and different ADD/DROP filters may use pilot signals of different frequencies, thereby avoiding mutual interference. For ADD/DROP filters needing closed-loop control, the ADD/DROP filters controlled in a closed-loop manner provided in the embodiments of this application do not affect a cascade characteristic of the ADD/DROP filters.

In some embodiments of this application, the pilot signal is introduced into the first optical signal of the add port. The pilot signal not only can be used for testing the power of the first optical signal, but also allows secondary modulation on the pilot signal, and loading bit information for transmitting a network management signal.

The embodiments of this application resolve a problem of controlling the operating wavelength when there are inputs at both the input port and the add port of the ADD/DROP filter. When the optical signal is a dense wavelength division multiplexing (DWDM) signal, two complementary symmetrical channels are locked simultaneously by using an optical signal from the add port. The hitless switching of the ADD/DROP filter is that in a process of switching the operating wavelength of an ADD/DROP filter from a current wavelength (wavelength existing) to a target wavelength (wavelength target), other wavelengths input from the input port of the ADD/DROP filter may not affect an output from the output port of the ADD/DROP filter. In addition, it should be noted that a wavelength locking process needs time, but an objective of the locking is to accurately control the operating wavelength of the ADD/DROP filter at the target wavelength. After the open-loop control of the micro heaters is completed, voltages or currents of the micro heaters are adjusted to values corresponding to the target wavelength, and a filtering spectrum of the ADD/DROP filter no longer affects other wavelengths.

According to the ADD/DROP filter provided in the embodiments of this application, the operating wavelength of the ADD/DROP filter is locked by using an optical signal input from add port, and a pilot signal is introduced into the upload optical signal, so that an optical power of the upload optical signal can be obtained at a detection point without being affected by a download optical signal. The ADD/DROP filter provided in the embodiments of this application supports the hitless wavelength switching. No pilot signal needs to be loaded to a signal at the input port, or even a pilot signal is included in the signal at the input port, the pilot signal may be directly discarded, and cascaded use of the add/drop filter is not affected. The optical signals in the ADD/DROP filter are distinguished by using the pilot signal, to implement closed-loop control on the operating wavelength of the ADD/DROP filter, thereby allowing the hitless wavelength switching without affecting cascading of devices.

Figure 11:
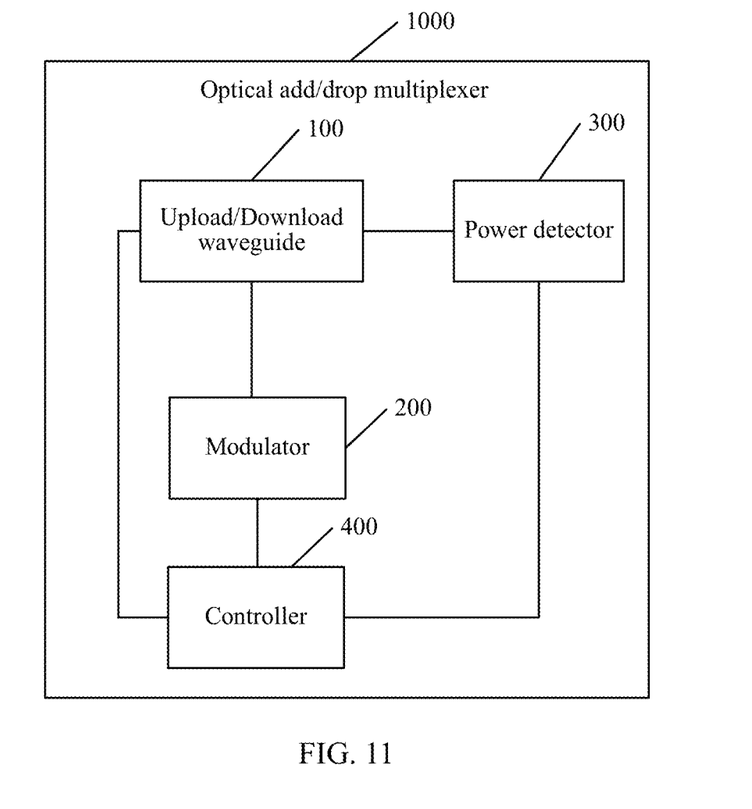
FIG. 11 is a schematic structural diagram of composition of an optical add/drop multiplexer according to an embodiment of this application.

As shown in FIG. 11, an embodiment of this application further provides an optical add/drop multiplexer 1000. The optical add/drop multiplexer 1000 includes: the ADD/DROP filter 100, the modulator 200, and the power detector 300 provided in the foregoing embodiments, and a controller 400.

The controller 400 is connected to the modulator 200, the ADD/DROP filter 100, and the power detector 300.

The modulator 200 is connected to the add port of the ADD/DROP filter 100.

The power detector 300 is connected to the output port and/or the drop port of the ADD/DROP filter 100.

The controller 400 is configured to: load, by using the modulator 200, a pilot signal to a first optical signal to obtain a second optical signal, and transmit the second optical signal to the add port of the ADD/DROP filter.

The power detector 300 is configured to: obtain an output optical signal from the output port or the drop port of the ADD/DROP filter and detect an optical power of the output optical signal.

The optical add/drop multiplexer 1000 may be specifically a tunable optical add/drop multiplexer (T-OADM). For the descriptions of the ADD/DROP filter 100, the modulator 200, and the power detector 300, refer to the descriptions in the foregoing embodiments. The controller 400 provided in this embodiment of this application is configured to: load, by using the modulator 200, the pilot signal to the first optical signal to obtain the second optical signal, and transmit the second optical signal to the add port of the ADD/DROP filter.

In some embodiments of this application, the controller 400 is further configured to demodulate, at a preset frequency, an optical power of an optical signal corresponding to the frequency. The controller 400 may be further configured to demodulate the optical signal to obtain the optical power of the preset frequency, thereby performing optical power analysis.

In some embodiments of this application, the optical add/drop multiplexer includes M cascaded ADD/DROP filters. A value of M depends on an application scenario. For example, M is a positive integer greater than or equal to 1.

In some embodiments of this application, the ADD/DROP filter further includes a micro heater.

The controller is further configured to adjust a current or a voltage of the micro heater.

The ADD/DROP filter is further configured to set a resonant wavelength to a target operating wavelength based on an adjusted current or voltage of the micro heater.

The ADD/DROP filter further includes: the micro heater. As shown in FIG. 4, FIG. 5, FIG. 6, FIG. 7, FIG. 9, and FIG. 10, the micro heater may be disposed around the waveguide in the ADD/DROP filter. In this case, the ADD/DROP filter is connected to the controller, and the controller may adjust the current or the voltage of the micro heater. Therefore, the ADD/DROP filter may set the resonant wavelength to the target operating wavelength based on the adjusted current or voltage of the micro heater, thereby implementing wavelength switching of the ADD/DROP filter.

It can be learned from the examples of the foregoing embodiments of this application that, the optical add/drop multiplexer includes the ADD/DROP filter, and the ADD/DROP filter includes the input port, the output port, the add port, and the drop port. The add port is connected to the modulator. The first optical signal and the pilot signal are separately input to the modulator. The modulator is configured to: load the pilot signal to the first optical signal to obtain the second optical signal, and transmit the second optical signal to the add port. Therefore, the second optical signal may be input to the add port, the third optical signal is input to the input port, and the wavelength difference between the second optical signal and the third optical signal is the integral multiple of the free spectral range. In addition, the power detector is connected to the output port and/or the drop port of the ADD/DROP filter provided in the embodiments of this application. The power detector is configured to: obtain the output optical signal from the output port or the drop port and detect the optical power of the output optical signal. In the embodiments of this application, the second optical signal is input to the add port of the ADD/DROP filter, the second optical signal is obtained by loading the pilot signal on the first optical signal, and therefore the first optical signal from the add port can be separated at the drop port or the output port. In this way, the measured optical power can be locked at the output port or the drop port without being affected by the third optical signal input to the input port. Therefore, the wavelength of the ADD/DROP filter can be locked at an incident wavelength in real time to implement closed-loop control on the ADD/DROP filter.

In addition, it should be noted that the described apparatus embodiment is merely an example. The units described as separate parts may or may not be physically separate, and parts displayed as units may or may not be physical units, may be located in one position, or may be distributed on a plurality of units. Some or all the modules may be selected according to actual needs to achieve the objectives of the solutions of the embodiments. In addition, in the accompanying drawings of the apparatus embodiments provided by this application, connection relationships between modules indicate that the modules have communication connections with each other, which may be specifically implemented as one or more communications cables or signal cables. A person of ordinary skill in the art may understand and implement the embodiments of the present invention without creative efforts.

What is claimed is:

1. An ADD/DROP filter, wherein the ADD/DROP filter comprises:
an input port, an output port, an add port, and a drop port;
the add port is connected to a modulator, a first optical signal and a pilot signal are separately input to the modulator, and the modulator is configured to: load the pilot signal to the first optical signal to obtain a second optical signal; and transmit the second optical signal to the add port;
the second optical signal is input to the add port, a third optical signal is input to the input port, and a wavelength difference between the second optical signal and the third optical signal is an integral multiple of a free spectral range of the ADD/DROP filter;
a power detector is connected to the output port and/or the drop port, and the power detector is configured to: obtain an output optical signal from the output port or the drop port and detect an optical power of the output optical signal;
an input/output waveguide, an annular waveguide, an ADD/DROP waveguide, and a first micro heater, wherein the first micro heater is disposed around the annular waveguide;
the input/output waveguide comprises: the input port and the output port;
the input/output waveguide and the annular waveguide form a first coupler at a first coupling position;
the annular waveguide and the ADD/DROP waveguide form a second coupler at a second coupling position; and the ADD/DROP waveguide comprises: the add port and the drop port;

wherein the input/output waveguide and the annular waveguide for a first coupler at a first coupling position comprises: the input/output waveguide and the annular waveguide form a tunable coupler at the first coupling position;

the ADD/DROP filter further comprises:

a second micro heater, wherein the second micro heater is disposed around the input/output waveguide;

the second micro heater is configured to adjust a coupling coefficient of the tunable coupler to be 0;

the input/output waveguide is further configured to output the third optical signal through the output port when the coupling coefficient of the tunable coupler is adjusted to be 0;

the first micro heater is configured to set a resonant wavelength of the ADD/DROP filter to a target operating wavelength by adjusting a current or a voltage of the first micro heater; and the second micro heater is configured to restore the coupling coefficient of the tunable coupler to a target value.

2. The ADD/DROP filter according to claim 1, wherein the ADD/DROP filter further comprises: an optical splitter;

the input/output waveguide is connected to the power detector through the optical splitter; or the ADD/DROP waveguide is connected to the power detector through the optical splitter.

3. The ADD/DROP filter according to claim 1, wherein that the input/output waveguide and the annular waveguide form a first coupler at a first coupling position comprises:

the input/output waveguide and the annular waveguide form a directional coupler or a multimode interference coupler at the first coupling position.

4. The ADD/DROP filter according to claim 3, wherein the annular waveguide comprises: N cascaded annular waveguides coupled to each other, wherein N is a positive integer greater than or equal to 2;

the first micro heater comprises: N micro heaters respectively disposed around the N cascaded annular waveguides; and the N micro heaters are configured to set the resonant wavelength of the ADD/DROP filter to the target operating wavelength by asynchronously adjusting currents or voltages of the corresponding micro heaters.

5. The ADD/DROP filter claim 1, wherein the first optical signal and the pilot signal are generated by a same optical signal generator.

6. The ADD/DROP filter according to claim 1, wherein bit information is loaded on the pilot signal.

7. An optical add/drop multiplexer, wherein the optical add/drop multiplexer comprises:

an ADD/DROP filter, a modulator, a power detector and a controller, wherein: the ADD/DROP filter comprises: an input port, an output port, an add port, and a drop port, wherein:

the add port is connected to the modulator, in which a first optical signal and a pilot signal are separately input; and a second optical signal is input to the add port, a third optical signal is input to the input port, and a wavelength difference between the second optical signal and the third optical signal is an integral multiple of a free spectral range of the ADD/DROP filter;

the ADD/DROP filter further comprises an input/output waveguide, an annular waveguide, an ADD/DROP waveguide, and a first micro heater, wherein the first micro heater is disposed around the annular waveguide;

the input/output waveguide comprises: the input port and the output port;

the input/output waveguide and the annular waveguide form a first coupler at a first coupling position;

the annular waveguide and the ADD/DROP waveguide form a second coupler at a second coupling position; and the ADD/DROP waveguide comprises: the add port and the drop port;

the controller is connected to the modulator, the ADD/DROP filter, and the power detector; the modulator is connected to the add port of the ADD/DROP filter;

the power detector is connected to the output port and/or the drop port of the ADD/DROP filter;

the controller is configured to: load, by using the modulator, a pilot signal to a first optical signal to obtain the second optical signal, and transmit the second optical signal to the add port of the ADD/DROP filter;

the power detector is configured to: obtain an output optical signal from the output port or the drop port of the ADD/DROP filter and detect an optical power of the output optical signal;

wherein the input/output waveguide and the annular waveguide form a first coupler at a first coupling position comprises: the input/output waveguide and the annular waveguide form a tunable coupler at the first coupling position;

the ADD/DROP filter further comprises:

a second micro heater, wherein the second micro heater is disposed around the input/output waveguide;

the second micro heater is configured to adjust a coupling coefficient of the tunable coupler to be 0;

the input/output waveguide is further configured to output the third optical signal through the output port when the coupling coefficient of the tunable coupler is adjusted to be 0;

the first micro heater is configured to set a resonant wavelength of the ADD/DROP filter to a target operating wavelength by adjusting a current or a voltage of the first micro heater; and the second micro heater is configured to restore the coupling coefficient of the tunable coupler to a target value.

8. The optical add/drop multiplexer according to claim 7, wherein the controller is further configured to demodulate, at a preset frequency, an optical power of an optical signal corresponding to the frequency.

9. The optical add/drop multiplexer according to claim 7, wherein the optical add/drop multiplexer comprises: M cascaded ADD/DROP filters, wherein M is a positive integer greater than or equal to 1.

10. The optical add/drop multiplexer according to claim 7, wherein the controller is further configured to adjust a current or a voltage of the first micro heater; and the ADD/DROP filter is further configured to set a resonant wavelength to a target operating wavelength based on the adjusted current or voltage of the first micro heater.

* * * * *

UNITED STATES PATENT AND TRADEMARK OFFICE
CERTIFICATE OF CORRECTION

PATENT NO. : 11,095,386 B2
APPLICATION NO. : 15/931714
DATED : August 17, 2021
INVENTOR(S) : Andrea Melloni et al.

Page 1 of 1

It is certified that error appears in the above-identified patent and that said Letters Patent is hereby corrected as shown below:

In the Claims

Column 16, Line 45, delete "signal;" and insert --signal-- therefore

Column 17, Line 4, delete "for" and insert --form-- therefore

Column 17, Line 47, delete "filter" and insert --filter according to-- therefore Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*